(12) United States Patent
Carter

(10) Patent No.: US 6,310,329 B1
(45) Date of Patent: Oct. 30, 2001

(54) HEATABLE CONTAINER ASSEMBLY

(76) Inventor: Tina H. Carter, 208 West Rd., Texas City, TX (US) 77591

( * ) Notice: Subject to any disclaimer, the term of this patent is extended or adjusted under 35 U.S.C. 154(b) by 0 days.

(21) Appl. No.: 09/658,409

(22) Filed: Sep. 8, 2000

(51) Int. Cl.[7] .................................................. F27D 11/00
(52) U.S. Cl. ......................... 219/432; 219/430; 219/433; 219/439; 219/442
(58) Field of Search .................... 219/428, 432, 219/430, 433, 434, 436, 439, 441, 442, 530, 540; 126/390.1

(56) References Cited

U.S. PATENT DOCUMENTS

| | | | |
|---|---|---|---|
| 3,054,395 | * | 9/1962 | Torino .................................. 219/432 |
| 3,322,113 | * | 5/1967 | Simjian ................................ 219/439 |
| 3,432,641 | * | 3/1969 | Welke .................................. 219/433 |
| 4,072,091 | * | 2/1978 | Richardson .......................... 219/432 |
| 4,164,644 | * | 8/1979 | Remsnyder et al. ................. 219/433 |
| 4,305,533 | * | 12/1981 | Wightman et al. .................. 219/430 |
| 4,399,351 | * | 8/1983 | Koff ..................................... 219/433 |
| 5,842,353 | * | 12/1998 | Kuo-Liang ........................... 219/432 |
| 5,856,653 | * | 1/1999 | Boudreaux ........................... 219/439 |
| 6,013,901 | * | 1/2000 | Lavoie .................................. 219/432 |
| 6,072,161 | * | 6/2000 | Stein .................................... 219/432 |
| 6,121,586 | * | 9/2000 | Taylor et al. ........................ 219/436 |
| 6,192,787 | * | 2/2001 | Montalto ............................. 219/430 |

* cited by examiner

*Primary Examiner*—Teresa Walberg
*Assistant Examiner*—Fadi H. Dahbour

(57) ABSTRACT

A heatable container assembly for heating liquids placed in the container. The heatable container assembly includes a base unit with a heating coil, a container positionable on the base unit, and a heatable gel positioned within a bottom chamber of the container.

7 Claims, 2 Drawing Sheets

HEATABLE CONTAINER ASSEMBLY

BACKGROUND OF THE INVENTION

1. Field of the Invention

The present invention relates to warming devices and more particularly pertains to a new heatable container assembly for heating liquids placed in the container.

2. Description of the Prior Art

The use of warming devices is known in the prior art. More specifically, warming devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,801,782; U.S. Pat. No. 5,243,684; U.S. Pat. No. 3,813,517; U.S. Pat. No. Des. 358,071; U.S. Pat. No. 5,072,095; and U.S. Pat. No. 4,523,083.

While these devices fulfill their respective, particular objectives and requirements, the aforementioned patents do not disclose a new heatable container assembly. The inventive device includes a base unit with a heating coil, a container positionable on the base unit, and a heatable gel positioned within a bottom chamber of the container.

In these respects, the heatable container assembly according to the present invention substantially departs from the conventional concepts and designs of the prior art, and in so doing provides an apparatus primarily developed for the purpose of heating liquids placed in the container.

SUMMARY OF THE INVENTION

In view of the foregoing disadvantages inherent in the known types of warming devices now present in the prior art, the present invention provides a new heatable container assembly construction wherein the same can be utilized for heating liquids placed in the container.

The general purpose of the present invention, which will be described subsequently in greater detail, is to provide a new heatable container assembly apparatus and method which has many of the advantages of the warming devices mentioned heretofore and many novel features that result in a new heatable container assembly which is not anticipated, rendered obvious, suggested, or even implied by any of the prior art warming devices, either alone or in any combination thereof.

To attain this, the present invention generally comprises a base unit with a heating coil, a container positionable on the base unit, and a heatable gel positioned within a bottom chamber of the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heatable container assembly apparatus and method which has many of the advantages of the warming devices mentioned heretofore and many novel features that result in a new heatable container assembly which is not anticipated, rendered obvious, suggested, or even implied by any of the prior art warming devices, either alone or in any combination thereof.

It is another object of the present invention to provide a new heatable container assembly which may be easily and efficiently manufactured and marketed.

It is a further object of the present invention to provide a new heatable container assembly which is of a durable and reliable construction.

An even further object of the present invention is to provide a new heatable container assembly which is susceptible of a low cost of manufacture with regard to both materials and labor, and which accordingly is then susceptible of low prices of sale to the consuming public, thereby making such heatable container assembly economically available to the buying public.

Still yet another object of the present invention is to provide a new heatable container assembly which provides in the apparatuses and methods of the prior art some of the advantages thereof, while simultaneously overcoming some of the disadvantages normally associated therewith.

Still another object of the present invention is to provide a new heatable container assembly for heating liquids placed in the container.

Yet another object of the present invention is to provide a new heatable container assembly which includes a base unit with a heating coil, a container positionable on the base unit, and a heatable gel positioned within a bottom chamber of the container.

Still yet another object of the present invention is to provide a new heatable container assembly that can be disassembled for cleaning.

Even still another object of the present invention is to provide a new heatable container assembly that maintains the temperature of a liquid within predetermined limits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
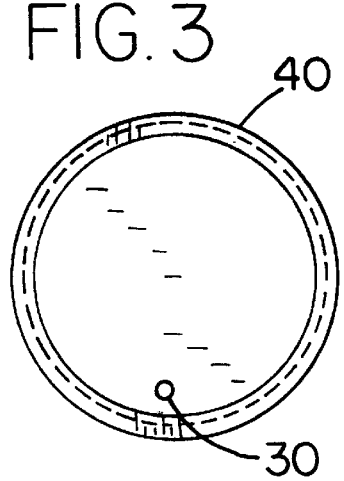
FIG. 1 is a schematic perspective view of a new heatable container assembly according to the present invention.
Figure 3:
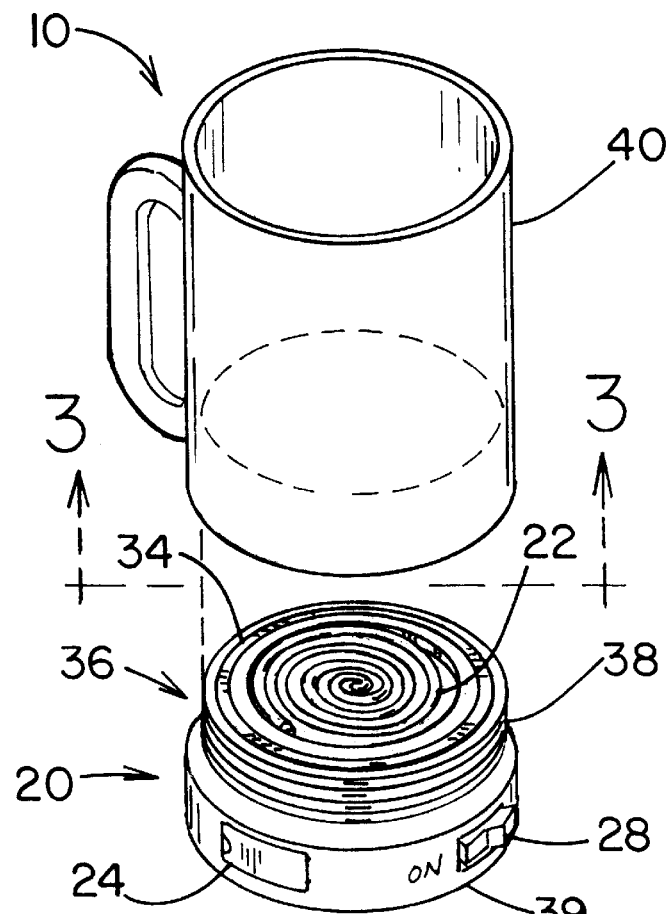
FIG. 3 is a schematic bottom view of the container of the present invention taken along line 3—3 of FIG. 1.
Figure 4:
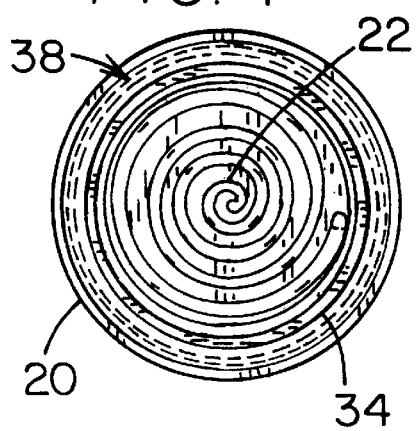
FIG. 4 is a schematic top view of the base unit of the present invention taken along line 4—4 of FIG. 2.
Figure 2:
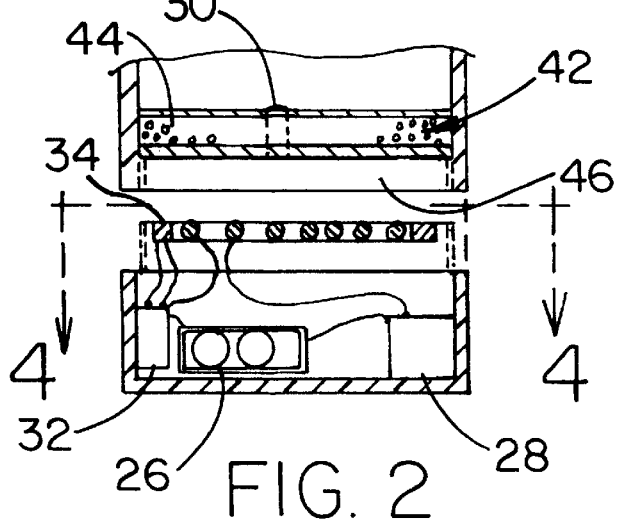
FIG. 2 is a schematic cross-sectional view of the present invention.
Figure 5:
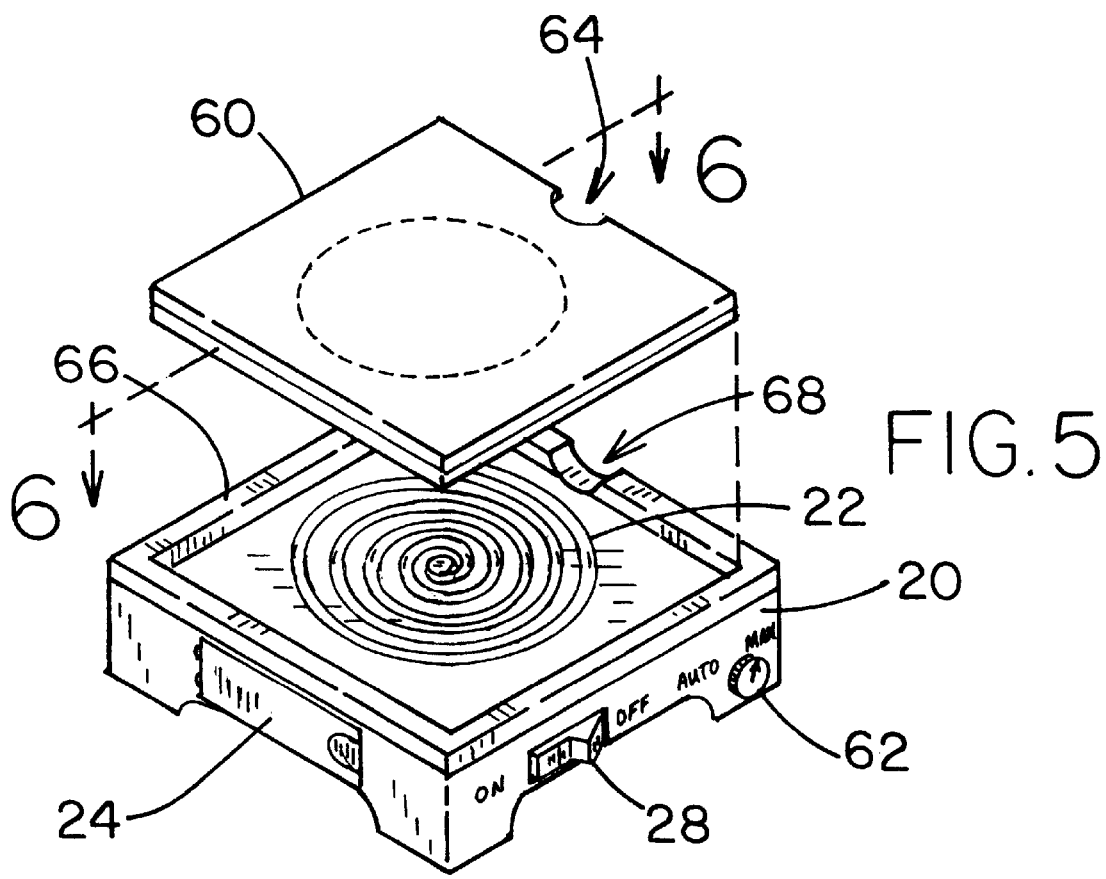
FIG. 5 is a schematic perspective view on an embodiment of the present invention.
Figure 6:
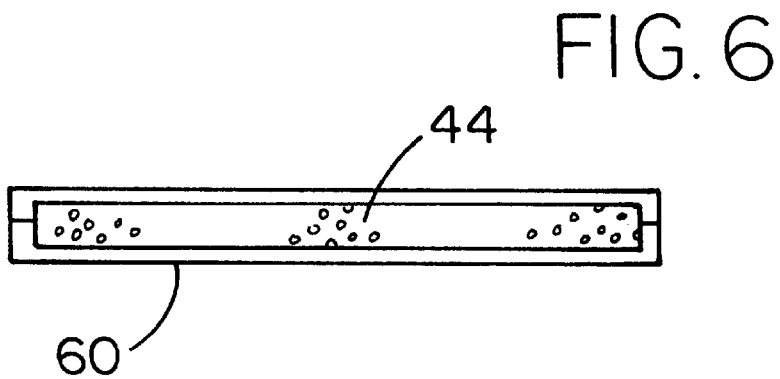
FIG. 6 is a schematic cross-sectional view of the coaster member of the present invention.

With reference now to the drawings, and in particular to FIGS. 1 through 6 thereof, a new heatable container assembly embodying the principles and concepts of the present invention and generally designated by the reference numeral 10 will be described.

As best illustrated in FIGS. 1 through 6, the heatable container assembly 10 generally comprises a container 40, a base unit 20, a battery 26, a temperature sensor 30, and a temperature control unit 32.

The base unit 20 includes a heating coil 22. The container 40 is positionable on the base 20. Thus the heating coil 22 transmits heat to the container 40.

The container 40 includes a bottom chamber 42. The bottom chamber 42 is filled with heatable gel 44 for promoting even heating of the container 40 and facilitating retention of heat transmitted from the heating coil 22.

The base unit 20 includes a battery compartment 24. The battery 26 is positioned in the battery compartment 24. The battery 26 is electronically coupled to the heating coil 22 for providing electrical current to the heating coil 22. Thus the heating coil 22 is heated.

The base unit 20 includes an on/off switch 28 electronically coupled between the battery 26 and the heating coil 22 such that the electronic coupling between the battery 26 and the heating coil 22 is interrupted when the on/off switch 28 is in an off position. Thus the battery 26 is prevented from heating the heating coil 22. The on/off switch 28 further is electronically coupled between the battery 26 and the heating coil 22 such that the electronic coupling between the battery 26 and the heating coil 22 is uninterrupted when the on/off switch 28 is in an on position. Thus the battery 26 provides electronic current to the heating coil 22.

The temperature sensor 30 extends into the bottom chamber 42 such that the temperature sensor 30 is in environmental communication with the gel 44 for measuring a temperature of the gel 44.

The temperature control unit 32 is positioned in the base unit 20. The temperature control unit 32 is electronically coupled between the battery 26 and the heating coil 22.

The base unit 20 includes an electrical contact 34 positioned for contacting the temperature sensor 30 when the container 40 is positioned on the base unit 20. The electrical contact 34 is electronically coupled to the temperature control unit 32 such that the temperature control unit 32 opens a temperature control switch to prevent electrical current between the battery 26 and the heating coil 22 when the temperature sensor 30 detects a gel 44 temperature in excess of a pre-determined upper threshold value.

The temperature control unit 32 further closes the temperature control switch when the temperature sensor 30 detects a gel 44 temperature below a pre-determined lower threshold value. Thus the gel 44 temperature is maintained between the pre-determined lower threshold value and the pre-determined upper threshold value when the on/off switch 28 is in the on position and the container 40 is positioned on the base unit 20.

The base unit 20 includes a generally disk shaped upper portion 36. The upper portion 36 includes an outwardly threaded outer perimeter face 38.

The container 40 includes a generally circular bottom lip 46. The bottom lip 46 is inwardly threaded for selectively engaging the outer perimeter face 38 of the base unit 20. Thus the container 40 is threadedly securable to the base unit 20.

The base unit 20 includes a generally disk-shaped lower portion 39.

The container 40 is generally cylindrical such that an outer surface of the container has a diameter equal to a diameter of an outer perimeter surface of the lower portion 39.

The height of the bottom lip 46 of the container 40 is substantially equal to a height of the upper portion 36 of the base unit 20. Thus the outer surface of the container 40 is positioned flush with the outer perimeter surface of the lower portion 39 of the base unit 20 and an upper surface of the upper portion 36 contacts a lower surface of the container 40 when the container 40 is secured to the base unit 20.

The electrical contact 34 is annular and extends proximate an outer edge of the base unit 20.

In an embodiment, the container heating assembly 10 comprises a base unit 20, a battery 26, a coaster member 60, and a timer unit. The coaster member 60 includes an interior space. The interior space is filled with a heatable gel 44. The coaster member 60 is positionable on the base unit 20. Thus the heating coil 22 transmits heat to the gel 44 when the coaster member 60 is positioned on the base unit 20. The base unit 20 includes a battery compartment 24. The battery 26 is positioned in the base unit 20. The battery 26 is electronically coupled to the heating coil 22 for providing electrical current to the heating coil 22. Thus the heating coil 22 is heated. The base unit 20 includes an on/off switch 28 electronically coupled between the battery 26 and the heating coil 22 such that the electronic coupling between the battery 26 and the heating coil 22 is interrupted when the on/off switch 28 is in an off position. Thus the battery 26 is prevented from heating the heating coil 22. The on/off switch 28 further is electronically coupled between the battery 26 and the heating coil 22 such that the electronic coupling between the battery 26 and the heating coil 22 is uninterrupted when the on/off switch 28 is in an on position. Thus the battery 26 provides electronic current to the heating coil 22. The timer unit is electronically coupled between the battery 26 and the heating coil 22. The timer unit includes a timer switch 62, which is electronically coupled between the battery 26 and the heating coil 22 such that the electronic coupling between the battery 26 and the heating coil 22 is interrupted after expiration of a pre-determined time period when the timer switch 62 is in an automatic shut-off position. Thus the battery 26 is prevented from heating the heating coil 22 after expiration of the pre-determined time period. The timer switch 62 further is electronically coupled between the battery 26 and the heating coil 22 such that the electronic coupling between the battery 26 and the heating coil 22 is uninterrupted when the timer switch 62 is in an on position. Thus the battery 26 provides electronic current to the heating coil 22. The base unit 20 includes an outer perimeter lip 66 for surrounding the coaster member 60 when the coaster member 60 is positioned on the base unit 20. The outer perimeter lip 66 of the base unit 20 includes a notch 68 designed for receiving a fingertip for facilitating manipulation of an edge of the coaster member 60 for facilitating removal of the coaster member 60 from the base unit 20. An outer edge of the coaster member 60 includes an arcuate indentation 64 alignable with the notch 68 in the outer perimeter lip 66 of the base unit 20 when the coaster member 60 is positioned on the base unit 20 for facilitating removal of the coaster member 60 from the base unit 20. And the coaster member 60 includes a non-skid upper surface designed for preventing sliding of a container 40 supported by the upper surface.

In use, a liquid is placed within the container. The on/off switch on the base unit is placed in the on position so that electric current flows from the battery to the heating coil. The heating coil transfers heat to the heatable gel placed in the bottom chamber of the container. The heatable gel transfers heat to the liquid place in the container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heatable container assembly comprising:
   a base unit having a heating coil;
   a container positionable on said base unit whereby said heating coil transmits heat to said container;
   said container including a bottom chamber, said bottom chamber being filled with heatable gel for promoting even heating of said container and facilitating retention of heat transmitted from said heating coil;
   a battery positioned in said base unit, said battery being electronically coupled to said heating coil for providing electrical current to said heating coil whereby said heating coil is heated;
   said base unit including an on/off switch electronically coupled between said battery and said heating coil such that said electronic coupling between said battery and said heating coil is interrupted when said on/off switch is in an off position whereby said battery is prevented from heating said heating coil, said on/off switch further being electronically coupled between said battery and said heating coil such that said electronic coupling between said battery and said heating coil is uninterrupted when said on/off switch is in an on position whereby said battery provides electronic current to said heating coil;
   a temperature sensor extending into said bottom chamber such that said temperature sensor is in environmental communication With, said gel for measuring a temperature of said gel;
   a temperature control unit positioned in said base unit, said temperature control unit being electronically coupled between said battery and said heating coil;
   said base unit including an electrical contact positioned for contacting said temperature sensor when said container is positioned on said base unit, said electrical contact being electronically coupled to said temperature control unit such that said temperature control unit opens a temperature control switch to prevent electrical current between said battery and said heating coil when said temperature sensor detects a gel temperature in excess of a pre-determined upper Threshold value.

2. The heatable container assembly of claim 1, further comprising:
   said temperature control unit further closes said temperature control switch when said temperature sensor detects a gel temperature below a pre-determined lower threshold value whereby said gel temperature is maintained between said pre-determined lower threshold value and said pre-determined upper threshold value when said on/off switch is in said on position and said container is positioned on said base unit.

3. The heatable container assembly of claim 1, further comprising:
   said base unit having a generally disk shaped upper portion, said upper portion having an outwardly threaded outer perimeter face;
   said container having a generally circular bottom lip, said bottom lip being inwardly threaded for selectively engaging said outer perimeter face of said base unit whereby said container is threaddedly securable to said base unit.

4. The heatable container assembly of claim 3, further comprising:
   said base unit including a generally disk-shaped lower portion;
   said container being generally cylindrical such that an outer surface of said container has a diameter equal to a diameter of an outer perimeter surface of said lower portion.

5. The heatable container assembly of claim 4, further comprising:
   a height of said bottom lip of said container being substantially equal to a height of said upper portion of said base unit whereby said outer surface of said container is positioned flush with said outer perimeter surface of said lower portion of said base unit and an upper surface of said upper portion contacts a lower surface of said container when said container is secured to said base unit.

6. The heatable container assembly of claim 1, further comprising:

said electrical contact being annular and extending proximate an outer edge of said base unit.

7. A heatable container assembly comprising:

a base unit having a heating coil;

a container positionable on said base unit whereby said heating coil transmits heat to said container;

said container including a bottom chamber, said bottom chamber being filled with heatable gel for promoting even heating of said container and facilitating retention of heat transmitted from said heating coil;

said base unit including a battery compartment;

a battery positioned in said battery compartment, said battery being electronically coupled to said heating coil for providing electrical current to said heating coil whereby said heating coil is heated;

said base unit including an on/off switch electronically coupled between said battery and said heating coil such that said electronic coupling between said battery and said heating coil is interrupted when said on/off switch is in an off position whereby said battery is prevented from heating said heating coil, said on/off switch further being electronically coupled between said battery and said heating coil such that said electronic coupling between said battery and said heating coil is uninterrupted when said on/off switch is in an on position whereby said battery provides electronic current to said heating coil;

a temperature sensor extending into said bottom chamber such that said temperature sensor is in environmental communication with said gel for measuring a temperature of said gel;

a temperature control unit positioned in said base unit, said temperature control unit being electronically coupled between said battery and said heating coil;

said base unit including an electrical contact positioned for contacting said temperature sensor when said container is positioned on said base unit, said electrical contact being electronically coupled to said temperature control unit such that said temperature control unit opens a temperature control switch to prevent electrical current between said battery and said heating coil when said temperature sensor detects a gel temperature in excess of a pre-determined upper threshold value;

said temperature control unit further closes said temperature control switch when said temperature sensor detects a gel temperature below a pre-determined lower threshold value whereby said gel temperature is maintained between said pre-determined lower threshold value and said pre-determined upper threshold value when said on/off switch is in said on position and said container is positioned on said base unit;

said base unit having a generally disk shaped upper portion, said upper portion having an outwardly threaded outer perimeter face;

said container having a generally circular bottom lip, said bottom lip being inwardly threaded for selectively engaging said outer perimeter face of said base unit whereby said container is threaddedly securable to said base unit;

said base unit including a generally disk-shaped lower portion;

said container being generally cylindrical such that an outer surface of said container has a diameter equal to a diameter of an outer perimeter surface of said lower portion;

a height of said bottom lip of said container being substantially equal to a height of said upper portion of said base unit whereby said outer surface of said Container is positioned flush with said outer perimeter surface of said lower portion of said base unit and an upper surface of said upper portion contacts a lower surface of said container when said container is secured to said base unit; and said electrical contact being annular and extending proximate an outer edge of said base unit.

\* \* \* \* \*